United States Patent
Pozharsky

(10) Patent No.: US 8,862,982 B2
(45) Date of Patent: Oct. 14, 2014

(54) SYSTEM AND METHOD OF FORMING HELP FILES

(75) Inventor: Ivan V. Pozharsky, Moscow (RU)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 132 days.

(21) Appl. No.: 12/408,013

(22) Filed: Mar. 20, 2009

(65) Prior Publication Data
US 2009/0241019 A1    Sep. 24, 2009

(30) Foreign Application Priority Data
Mar. 21, 2008  (RU) ................................ 2008110755

(51) Int. Cl.
*G06F 17/00* (2006.01)
*G06F 9/44* (2006.01)

(52) U.S. Cl.
CPC .................................... *G06F 9/4446* (2013.01)
USPC ............ 715/234; 715/236; 715/239; 715/705

(58) Field of Classification Search
None
See application file for complete search history.

(56) References Cited

U.S. PATENT DOCUMENTS

| | | | |
|---|---|---|---|
| 6,236,989 B1 | 5/2001 | Mandyam et al. | |
| 6,856,989 B1 * | 2/2005 | Zhou et al. ............................. | 1/1 |
| 6,990,532 B2 | 1/2006 | Day et al. | |
| 7,765,469 B2 * | 7/2010 | Sembower et al. ........... | 715/243 |
| 2003/0084115 A1 | 5/2003 | Wood et al. | |
| 2003/0200348 A1 * | 10/2003 | Humphries ................... | 709/310 |
| 2003/0229608 A1 | 12/2003 | Reynar et al. | |
| 2004/0210837 A1 * | 10/2004 | Black et al. ................... | 715/513 |
| 2005/0125729 A1 | 6/2005 | Lee et al. | |
| 2006/0085750 A1 | 4/2006 | Easton, Jr. et al. | |
| 2006/0129931 A1 | 6/2006 | Simons et al. | |
| 2007/0136667 A1 | 6/2007 | Gerhart et al. | |
| 2007/0220429 A1 * | 9/2007 | Kureshy et al. ................ | 715/708 |
| 2009/0077502 A1 * | 3/2009 | Bird et al. ...................... | 715/853 |
| 2009/0132919 A1 * | 5/2009 | Allen et al. ................... | 715/708 |

FOREIGN PATENT DOCUMENTS

KR    20040061421    7/2004

OTHER PUBLICATIONS

Schafer, Andrew J.; "XML Comments Let You Build Documentation Directly From Your Visual Studio .NET Source Files"; Jun. 2002; MSDN Magazine; pp. 1-8.*
Tidwell, Doug; "XSLT"; 2008; O'Reilly;2nd Edition; pp. 25-44.*
Korean Office Action dated Sep. 27, 2013 issued in KR Application No. 10-2009-0024085.

* cited by examiner

*Primary Examiner* — Stephen Hong
*Assistant Examiner* — Asher Kells
(74) *Attorney, Agent, or Firm* — Stanzione & Kim, LLP

(57) ABSTRACT

A system of forming a help file in a computer system, including an external configuration file containing information about a computer application running on the computer system, a help file having at least one page of help and an internal configuration file, and a control element to generate the at least one page of help according to the internal configuration file, wherein the control element incorporates the information from the external configuration file to the at least one page of help upon activation of the pages of help.

15 Claims, 3 Drawing Sheets

SYSTEM AND METHOD OF FORMING HELP FILES

CROSS-REFERENCE TO RELATED APPLICATIONS

This application claims priority under 35 U.S.C. §119(a) to Russian Patent Application No. 2008-110755, filed on Mar. 21, 2008, in the Russian Intellectual Property Office, the disclosure of which is incorporated herein in its entirety by reference.

BACKGROUND

1. Field of the Inventive Concept

The present general inventive concept relates to computer techniques and to devices and methods of data processing, and more particularly, to systems and methods of forming help files in computer applications.

2. Description of the Related Art

Help files are widely used to provide a user of a computer system with pages of help describing the functions of a computer system so as to help the user. The pages of help, which can be provided in HTML format (CHM files), are widely used in applications of operating systems (OS), including OS Windows. Such pages of help can be implemented in the form of HTML documents having wide graphic opportunities familiar to the majority of computer users. The pages of help generally provide convenient division of the text into parts by subjects, support of cross links, and an opportunity to build-in small programs, such as Java Scripts, Visual Basic Script, and the like, to improve availability and to simplify improvement of HTML documents and construction of CHM of files.

HTML help pages can be called in the context of a current application running on the computer system. Thus, at visualization of help files, the user can see the page(s) of help, which provides the user with information describing the functions of the current application on an element of the page.

In conventional operating system environments, although the help files can represent a set of pages of help in HTML format with JavaScript programs to provide some interactivity for the pages, the text of the pages is not easily changed.

Such kinds of files of help have inconvenience in support when it is necessary to make changes to similar files of help, for example, to change all transfers of a file of help for some application (program) or when there are similar files of help for different versions of one application, since the pages of a file of help cannot dynamically change contents and cannot exchange contents with each other.

Korean published application number KR 2004-61421 discusses a method and system of formation of a file of help (i.e., help file) based on field values of the set parameter. However, such systems are not entirely satisfactory in providing sufficient efficiency, i.e. sufficient speed of execution of tasks, to enable forming help files concerning a wide set of applications and questions in a real time mode.

In order to change contents of the help file (for example, at transferring a part of the text, configuring the help file with an external parameter, changing contents from one page of help to another) it is necessary to make changes to the main program (application) and to recompile the main program, thus increasing laboriousness and reducing the speed of operation of the computer system.

U.S. Patent Application Publication number 2005/0125729 is directed to a help file generating method and apparatus in which configuration data is recorded in a separate file of adjustment, and the help file, which is in the form of code HTML, is formed based on the configuration data.

SUMMARY

The present general inventive concept can be achieved by providing dynamic formation of pages of a help file, based on configuration data recorded in a file by predetermined schemes of transformation of control elements to form the pages of help.

The present general inventive concept can provide a system and method to hide or show contents of the page(s) of help, to change representation of these contents (for example, to replace the text with a hyperlink to another page with the description) as well as to transfer these contents to another page of help without having to repeatedly integrate the file of help or to recompile the program application when the contents of the pages of help are changed.

Additional embodiments of the present general inventive concept will be set forth in part in the description which follows and, in part, will be obvious from the description, or may be learned by practice of the general inventive concept.

According to an example embodiment of the present general inventive concept, there is provided a system of forming a help file, including an external configuration file containing information about a computer application of a computer system, a help file including at least one page of help and an internal configuration file, and a control element to form the help file and to generate the at least one page of help according to the internal configuration file, wherein the control element incorporates the information from the external configuration file to the at least one page of help upon receiving a request to activate the at least one page of help.

The control element can locate a path of the external configuration file to reproduce the information from the external configuration file to the at least one page of help or to generate a link to the information from the at least one page of help, according to a setting of the external configuration file.

The control element can include a first control element to transform a format of the external configuration file to a format of the help file and a second control element to form the at least one page of help to include the transformed external configuration file.

The control element can replace the information in the at least one page of help with information from another external configuration file without re-forming the help file.

The external configuration file can be executed in the format of XML.

The control element can be executed in the form of a JavaScript program.

The control element can be executed in the form of ActiveX-object of MSXML.

The internal configuration file can be executed in the format of XSLT.

The page of help can be executed in the format of HTML.

According to another example embodiment of the present general inventive concept, there is provided a method of forming a help file in a computer system, the method including activating a page of help from within a help file of the computer system, transforming an external configuration having information about a computer application of the computer system, and incorporating the information of the external configuration file to the page of help.

The method can further include displaying the information of the external configuration file on the page of help.

The displaying of the information of the external configuration file can include generating a link to the information of the external configuration file from the page of help.

The incorporating of the information of the external configuration file to the page of help can include recording the information of the external configuration file to the page of help.

The recording of the information of the external configuration file to the page of help includes transforming a format of the external configuration file to a format of the page of help.

The path can be recorded as a temporary file when a length of a command line of an operating system of the computer application is limited.

The information can be recorded to the page of help using a "write" of object "document" method.

The information can be recorded to the page of help by recording of code in a predetermined element of the page of help.

The method can further include forming the help file according to an internal configuration file of the help file, and replacing the information in the page of help with information from another external configuration file without re-forming the help file.

According to another example embodiment of the present general inventive concept, there is provided a computer-readable recording medium having embodied thereon computer readable codes to execute a method of forming a help file in a computer system, the method including activating a page of help from within a help file of the computer system, transforming an external configuration file having information about a computer application of the computer system, and incorporating the information of the external configuration file to the page of help.

BRIEF DESCRIPTION OF THE DRAWINGS

Exemplary embodiments of the present general inventive concept will become apparent and more readily appreciated from the following description of the example embodiments, taken in conjunction with the accompanying drawings of which.

DETAILED DESCRIPTION OF THE EMBODIMENTS

Figure 1:
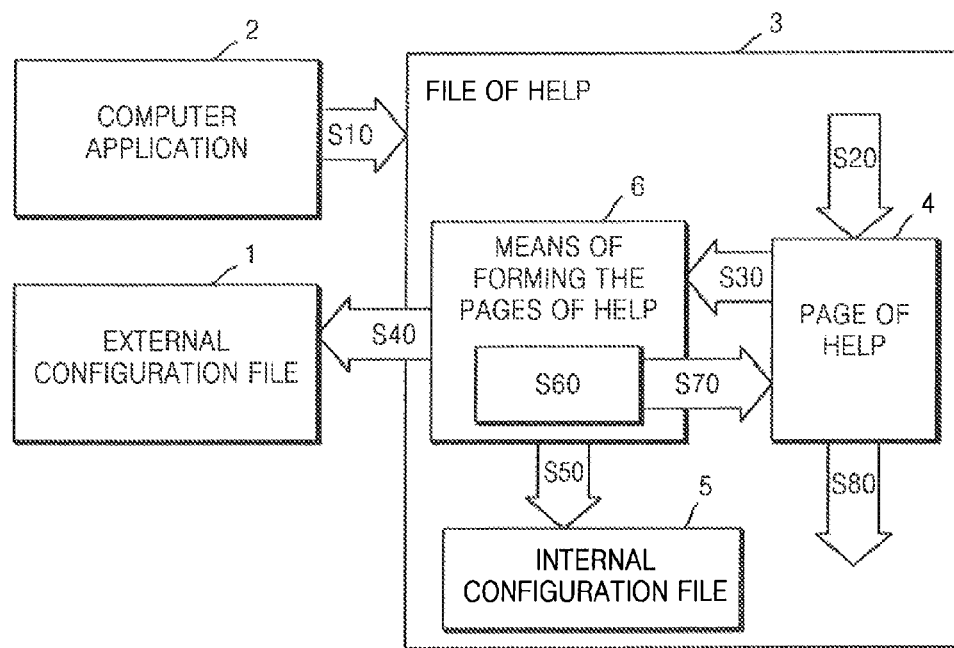
FIG. 1 is a diagram illustrating a system of forming a help file according to an embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a diagram illustrating a system of forming a help file according to an embodiment of the present general inventive concept.

The system of forming a help file can contain an external configuration file 1, a computer application 2, and a compiled file of help 3 in connection with one another. The compiled help file 3 can include at least one page 4 of help, at least one internal configuration file 5, and a means 6 of forming the pages of help.

Although the present general inventive concept is not limited thereto, the external configuration file 1 can be executed in a format of XML, the page of help 4 can be executed in a format of HTML, the internal configuration file 3 of help can be executed in a format of XSLT, and the means 6 of forming the pages of help can be a control element executed in the form of a JavaScript program.

A method of forming a help file according to example embodiments of the present general inventive concept will be described with reference to FIGS. 1-3.

Figure 2:
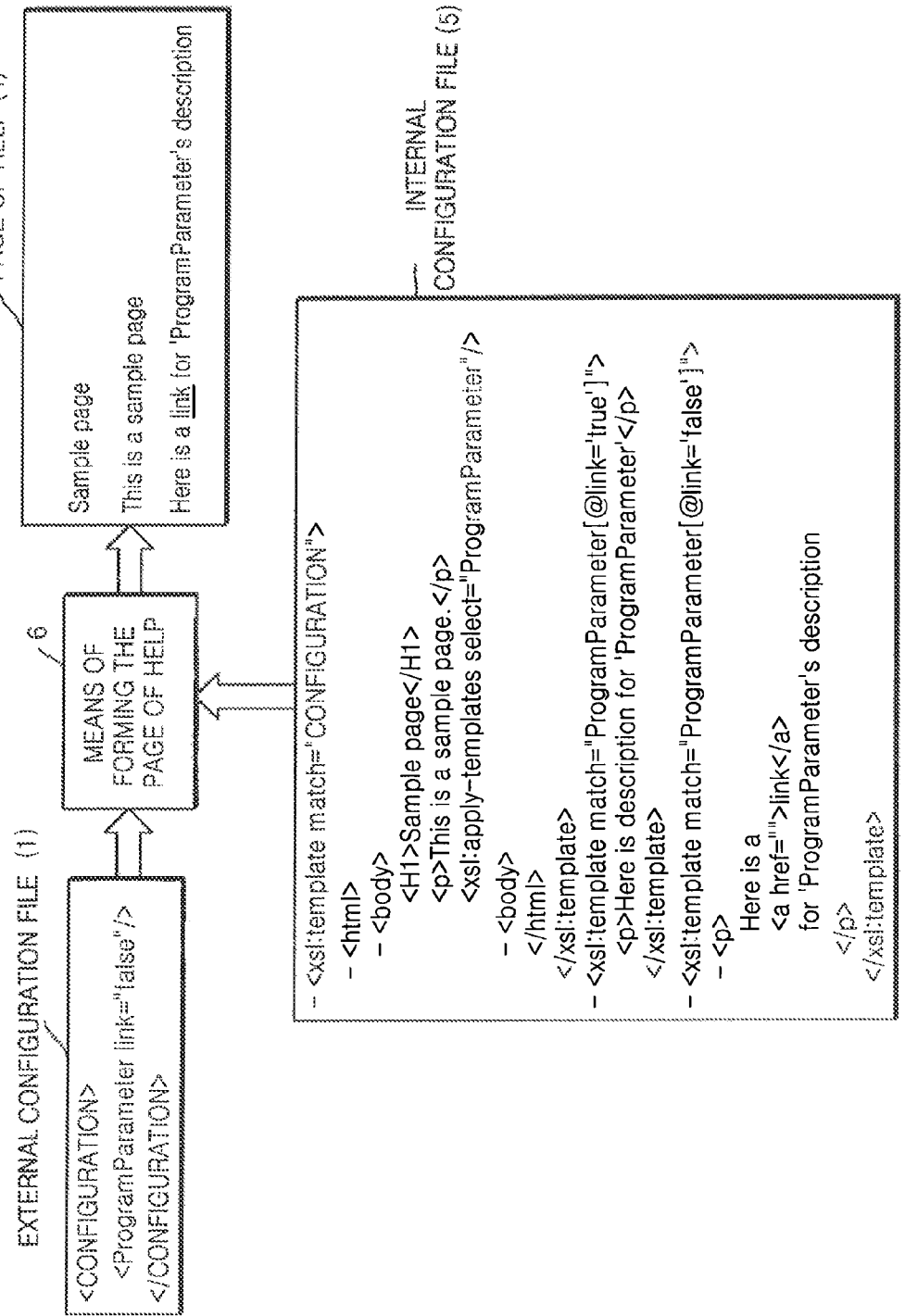
FIG. 2 is a diagram illustrating a method of forming a help file according to another embodiment of the present general inventive concept.
Figure 3:
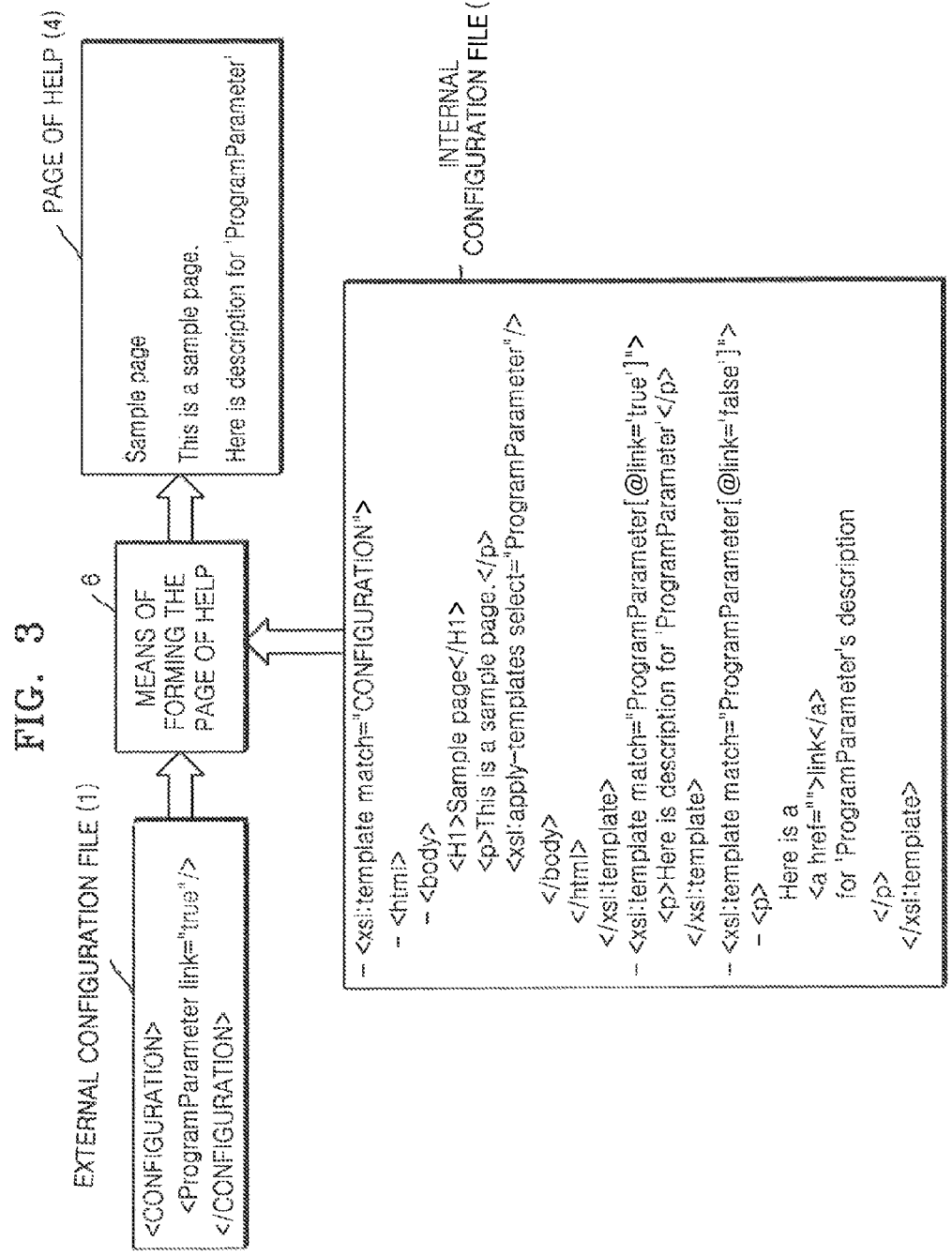
FIG. 3 is a diagram illustrating a method of forming a help file according to another embodiment of the present general inventive concept.

As illustrated in FIGS. 1-3, upon receiving a query of granting the help, the compiled file 3 of help can be activated using the computer application 2, at operation S10. At this time, the path to the external XML configuration file 1 can be recorded in the help file 3 among parameters of a command line such that the help file 3 is configured with the structure and parameters necessary to display the required information in the page of help 4.

The page 4 of help can be activated using the compiled file 3 of help, at operation S20.

The means 6 of forming the pages of help, which can include first and second control elements executed in the form of a JavaScript program, can be activated by using the page 4 of help, at operation S30.

The first control element can be created in the form of an ActiveX-object MSXML using the JavaScript program, and the external configuration file 1 XML can be loaded into this first control element, at operation S40. Here, the first control element can locate the external configuration file 1 by the specified path. The second control element can also be created in the form of an ActiveX-object MSXML, and the internal configuration file 5 XSLT can be loaded into this second control element, at operation S50. The internal configuration file 5 can contain schemes to transform the page 4 of help, and can be located inside of the compiled file 3 of help.

At operation S60, the function of the first control element (e.g., ActiveX-object MSXML) can be activated using the means 6 of forming the pages of help (e.g., JavaScript program). At this time, the external configuration file 1 XML can be loaded into the first control element in order to transform the format of the external configuration file 1 from XML format to HTML format. The second control element (e.g., ActiveX-object MSXML), in which the internal configuration file 5 XSLT can be loaded, can be transferred to this function. The transformation of the external configuration file 1 can be made using a function of the first element of control.

At operation S70, the received result of the transformation can be recorded in HTML code of page 4 of help using of means 6 of formation of help (JavaScript program).

At operation S80, the dynamically created page 4 of help incorporating the external configuration file 1 can be displayed to the user.

In accordance with the present general inventive concept, it is possible to dynamically form a final, flexible help file describing the functions of any number of applications running on a computer system, since the quantity of XML files and quantity of their transformations is virtually without limit in a given computer system.

In the example embodiments of the present general inventive concept, the configuration file of the application can be used as a base for the help file. It is possible to dynamically form a final, flexible help file which incorporates the structure and parameters of information regarding adjustment of the application, since one file of a configuration can automatically change any file of help for the given application. As a result, laboriousness in forming the help file can be decreased, and the speed of forming the help file can be increased.

As described above, the means of forming the pages of help can be executed with the creation of the first and second control elements of the means of forming the pages of help, carrying out transformation of the external configuration file, with an opportunity to load the external configuration file accordingly, which can be located on its specified path, and the internal configuration file, which can contain schemes of transforming the page of help and which can be located inside of the compiled file of help. Upon activation of the function, the first control element can carry out transformation of the external configuration file and the function can transfer control to the second control element to form the pages of help, and also with an opportunity to write the received result of the transformation in a code of page.

As described above, example embodiments of the present general inventive concept can provide a system of forming help files, including an external configuration file, computer application and a compiled file of help connected with each other. The compiled file of help can contain at least one page of help, at least one internal configuration file, and a means of forming the pages of help, which can contain a control element having first and second elements of control to carry out transformation of the external configuration file and forming of the flexible help file.

In operation, a computer application can be executed with an opportunity of reception of a query of the user of granting help, activation of the compiled file of help in which the structure and parameters of adjustment of the applications are displayed by the page of help The compiled file of help can be executed with an opportunity to activate the page of help, and the page of help can be executed with an opportunity to activate the means of forming the pages of help.

The compiled file of help can be activated using a computer application, and a path to the external configuration file can be recorded in this compiled file. The path can include the structure and parameters of adjustment of a given application necessary to display the required information in the page of help;

The page of help can be activated using the compiled file of help, and the means of forming the pages of help can be activated using the page of help.

The first control element can be created using the means of forming the pages of help, and the external configuration file can be loaded in this element with reference to the specified path.

The second control element can be created using the means of forming the pages of help, and the internal configuration file can be loaded in this element. The internal configuration file can contain the schemes of transformation of the page of help, and can be located inside the compiled file of help.

The control function of the first control element can be activated in the first element using the means of forming the pages of help. The first control element can carry out transformation of the external configuration file to be supported by the format of the page of help. The second control element can be transferred to this function and transformation of the pages of help to include the transformed information of the external configuration file can be carried out.

The received result of the transformation can be recorded in the code of the page of help using the means of forming the pages of help, and the page of help can be displayed to the user.

Example embodiments of the present general inventive concept can be used when there is a plurality of applications and files of help associated with them which have insignificant configuration differences between them. For example, it is possible to have one common file of help for a plurality of program applications, thus reducing the time and cost of creating and supporting the plurality of applications, and the help files associated with them.

The present general inventive concept can also be embodied as computer-readable codes on a computer-readable medium, and can be implemented as program code segments to perform operations necessary to the respective elements of the present general inventive concept. The computer-readable medium can include a computer-readable recording medium and a computer-readable transmission medium. The computer-readable recording medium can be any data storage device that can store data which can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer-readable code is stored and executed in a distributed fashion. Also, functional programs, codes, and code segments to accomplish the present general inventive concept can be easily construed by programmers skilled in the art to which the present general inventive concept pertains Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A computer system to form a help file, comprising:
an external configuration file containing information about a computer application running on a computer system;
a compiled help file including at least one help page and an internal configuration file containing schemes to transform the at least one help page; and
a computer control element disposed within a computer to form the help file and to generate the at least one help page according to the internal configuration file,
wherein the computer control element locates a path of the external configuration file, which is recorded on the compiled help file, transforms a format of the external configuration file from a first file format of the external configuration file to a second file format of the help page by using the internal configuration file and records transformation code including the transformed external configuration file having the second file format in the help page such that at least one transformed help page, of the computer application, incorporating the information from the external configuration file is generated upon receiving a request to activate the at least one help page of the computer application.

2. The system of claim 1, wherein the computer control element reproduces the information from the external configuration file to the at least one help page or generates a link to the information from the at least one help page, according to a setting of the external configuration file.

3. The system of claim 1, wherein the computer control element comprises a first control element to transform the format of the external configuration file from the first file format to the second file format, and a second control element to form the at least one help page to include the transformed external configuration file.

4. The system of claim 1, wherein the computer control element replaces the information in the at least one help page with information from another external configuration file without re-forming the help file.

5. The system of claim 1, wherein the external configuration file is executed in the format of XML.

6. The system of claim 5, wherein the computer control element transforms the XML format of the external configuration file to an HTML format.

7. The system of claim 1, wherein the computer control element is executed in the form of a scripting language.

8. The system of claim 1, wherein the computer control element is executed in the form of a prewritten software component.

9. The system of claim 1, wherein the internal configuration file is executed in the format of XSLT.

10. The system of claim 1, wherein the help page is executed in the format of HTML.

11. A method of forming a help file in a computer system, the method comprising:
   activating at least one help page from within a compiled help file of the computer system in response to a request to activate the at least one help page;
   locating a path of an external configuration file, which is recorded on the compiled help file;
   transforming a format of the external configuration file having information about a computer application running on the computer system from a first file format of the external configuration file to a second file format of a second file format of the at least one of help page by using an internal configuration file included in the compiled help file, the internal configuration file contains schemes to transform the help page;
   recording transformation code including the transformed external configuration file having the second file format in the at least one help page; and
   generating a transformed help page of the computer application, the transformed help page is generated with incorporating the information of the external configuration file based on the recorded transformation code of the at least one help page.

12. The method of claim 11, further comprising:
   replacing information in the at least one help page with information from the external configuration file without re-forming the help file.

13. The method of claim 11, further comprising:
   displaying the information of the external configuration file on the transformed help page.

14. The method of claim 11, wherein the information is recorded to the transformed help page by recording of code in a predetermined element of the help page.

15. A non-transitory computer-readable recording medium having embodied thereon computer readable codes to execute a method of forming a help file in a computer system, the method comprising:
   activating at least one help page from within a compiled help file of the computer system in response to a request to activate the at least one help page;
   locating a path of an external configuration file, which is recorded on the compiled help file;
   transforming a format of the external configuration file having information about a computer application running on the computer system from a first file format of the external configuration file to a second file format of a second file format of the at least one of help page by using an internal configuration file included in the compiled help file, the internal configuration file contains schemes to transform the help page;
   recording transformation code including the transformed external configuration file having the second file format in the at least one help page; and
   generating a transformed help page of the computer application, the transformed help page is generated with incorporating the information of the external configuration file based on the recorded transformation code of the at least one help page.

* * * * *